Aug. 24, 1965
B. N. ROBINSON
3,201,951
UPDRAFT CONTINUOUS FREEZER
Filed Dec. 16, 1963
2 Sheets-Sheet 1
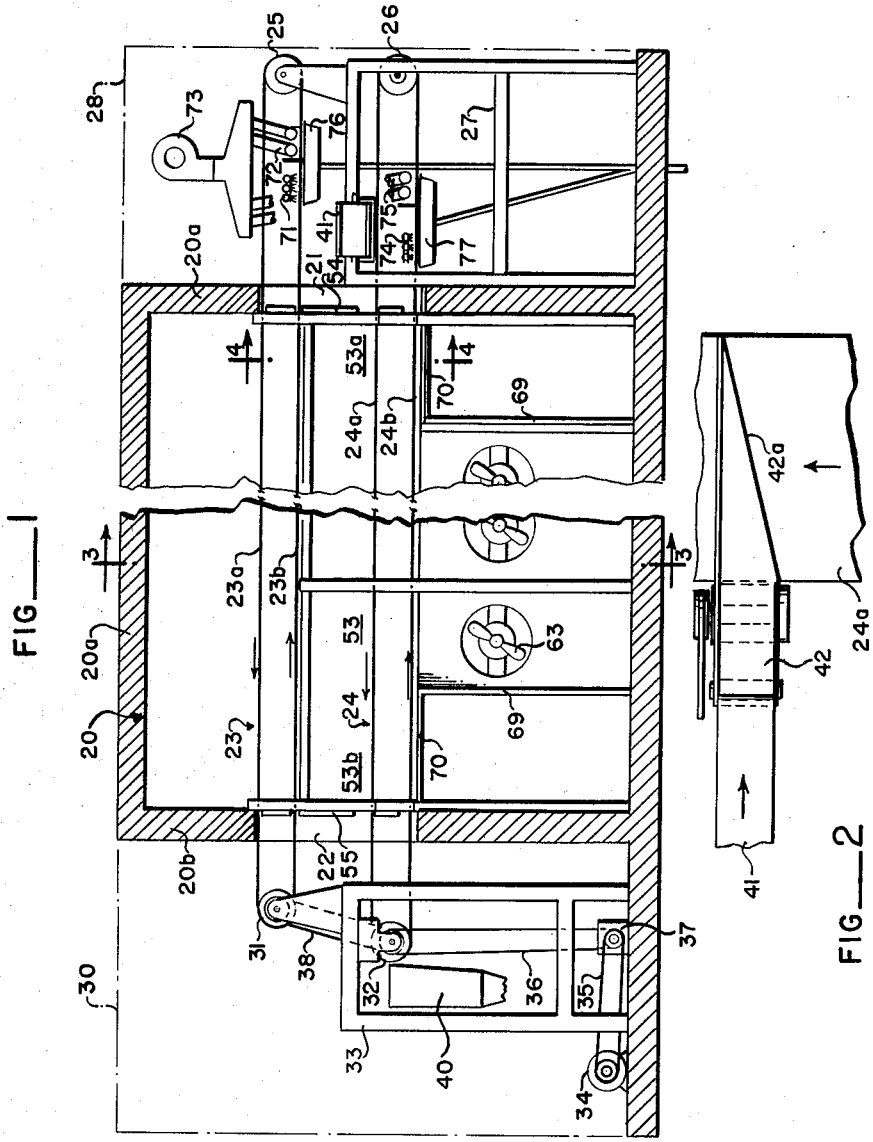
BERT N. ROBINSON
*INVENTOR.*
BY *Seed + Berry*
*ATTORNEYS*

Aug. 24, 1965
B. N. ROBINSON
3,201,951
UPDRAFT CONTINUOUS FREEZER
Filed Dec. 16, 1963
2 Sheets-Sheet 2
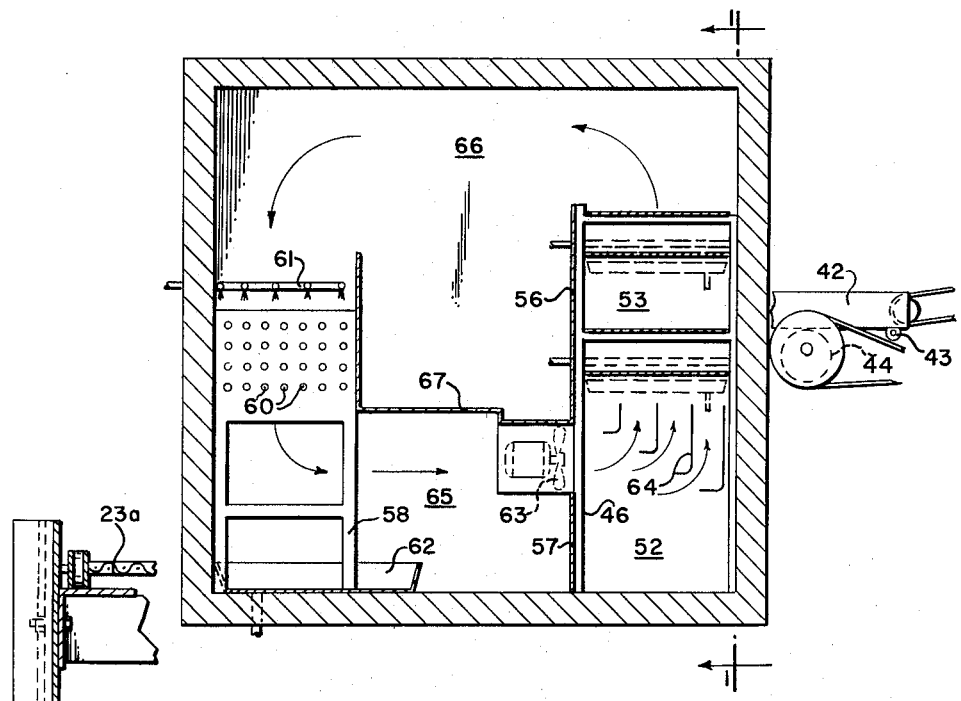
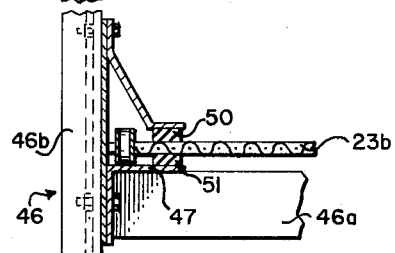
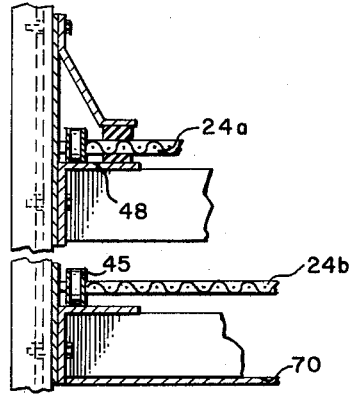
BERT N. ROBINSON
*INVENTOR.*
BY *Seed + Berry*
ATTORNEYS United States Patent Office 3,201,951
Patented Aug. 24, 1965

3,201,951
UPDRAFT CONTINUOUS FREEZER
Bert N. Robinson, Seattle, Wash., assignor to W. E. Stone & Co., Inc., Seattle, Wash., a corporation of Washington
Filed Dec. 16, 1963, Ser. No. 330,884
11 Claims. (Cl. 62—272)

The present invention relates to updraft continuous freezers for comestibles, i.e., freezing tunnels in which refrigerated air is circulated in a closed loop upwardly through comestibles while they are carried along on a perforated or open-mesh conveyor belt.

Prior to the updraft continuous freezer disclosed in pending application Ser. No. 173,522, filed February 15, 1962, now Patent No. 3,139,739, wherein the comestibles to be frozen were carried on the lower course of the conveyor belt, it has been standard practice in updraft freezers to carry the comestibles on the upper run of the belt. This has the objection that the air current carries pieces and particles of the comestibles from the conveyor fans on which they thereupon freeze, and scatters them to other parts of the freezing tunnel. The present invention aims to provide an improved updraft freezer in which the comestibles can still be carried on the upper run of the conveyor belt and yet will be confined to eliminate the aforesaid objection.

Another object of the invention is to not only decrease the shut-downs for tunnel clean-up, but to also decrease the frequency of shut-downs for defrosting of the refrigeration coils, and thereby increase the effective output of the freezing tunnel.

Other more particular objects and advantages of the invention, will, with the foregoing, appear and be understood in the course of the following description and claims, the invention consisting in the novel construction and in the adaptation and combination of parts hereinafter described.

In the accompanying drawings:

FIG. 1 is a longitudinal vertical sectional view of a freezing tunnel embodying the present invention, and taken along line 1—1 of FIG. 3, FIG. 2 is a fragmentary plan view taken directly above the feeder, FIG. 3 is a transverse vertical sectional view taken along the line 3—3 of FIG. 1; and FIG. 4 is a detail fragmentary transverse sectional view taken as indicated by the line 4—4 in FIG. 1.

Referring to the drawings, 20 designates an insulated freezing tunnel having ingress and egress openings 21–22 in its head and foot walls 20A–20B, respectively, for the passage of the upper and lower courses 23A–23B of vertically spaced upper and lower endless perforated or open-mesh belts 23–24. The upper course 24A of the lower belt 24 serves as a conveyor for the comestibles to be frozen while the lower course 23B of the upper belt 23 helps to isolate the comestibles as they are being conveyed through the freezing tunnel. The upper belt also serves an important frost collection function which will be hereinafter described.

At their head end the belts 23–24 pass over idlers 25–26 with their journal mounted on a stand 27 in a loading compartment 28. From these idlers the courses of the belt travel in parallel relation through the freezing tunnel into a discharge compartment 30 and there pass over respective driven sprockets 31–32 in turn journal mounted on a stand 33. An electric motor 34 drives the sprocket 32 of the lower belt via V-belts 35–36 and a gear reduction box 37. The upper belt is in turn driven as by a V-belt 38 from the drive of the lower belt. With this arrangement the lower course 23B of the upper belt travels toward the loading compartment 28 while the upper course 24A of the lower belt is carrying product towards the discharge 30 for dumping into a hopper 40 emptying onto a suitable egress conveyor as is well known in the art.

Located in the front compartment 28 and extending transversely of the belts is a product feeder for delivering the comestible products to be frozen to the upper course 24A of the lower belt. This feeder may take the form of a belt conveyor 41 discharging onto a shaker pan 42 which traverses the upper course 24A and feeds thereto along a diagonal edge 42A to evenly spread the product on the lower belt. The pan 42 is vibrated or gently shaken endwise about the pivot 43 as by a motor driven eccentric 44.

The belts 23–24 may take the form of thermally-conductive woven wire secured along their longitudinal side edges to respective chains 45. To prevent belt sagging within the freezing tunnel there is provided along one side thereof a belt stand 46 having cross braces 46A extending between pairs of legs 46B at the level of the courses 23A–23B and 24A–24B of the belt and these may be supplemented by diagonal braces. Upper and lower enclosed guide ways 47–48 for the respective chains 45 during their travel along the lower course 23B and upper course 24A of the upper and lower belts, respectively, are supported by the stand 46. They each have sealing strips 50–51 which wipe the respective belt inwardly of the chains. The sides of the belt stands are enclosed by side plates or panels defining a longitudinal plenum 52 beneath the lower belt 24, and a longitudinal freezing zone 53 between the lower course 23B of the upper belt and the upper course 24A of the lower belt. Vertical sets of baffles 54–55 are mounted on the ends of the stand 46 to close off the space in the tunnel openings 21–22 between the respective courses of the belts 23–24 and to close the ends of the freezing zone 53 other than for passage of the belt courses 23B, 24A and the product being frozen. To provide access to the freezing zone for cleaning, some of the side panels 56 facing the center of the freezing tunnel are made readily movable, and similarly certain of the panels 57 at the bottom of the plenum 52 are access panels.

Opposite the belt stand 46 there is provided an elongated stand 58 for supporting a bank of refrigerated freezing coils 60 arranged for circulation of air downwardly therethrough. A water spray manifold 61 may be provided above the coil bank 60 for defrosting thereof. In this regard, the coil stand 58 rests on a drain pan 62 to collect the defrosting water and residue.

A line of motor driven propeller fans 63 is mounted on the belt stand 46 above the floor of the freezing tunnel for blowing air upwardly through the belts 23–24. Each fan is provided with a set of turning baffles 64 in the plenum 52 to direct the air upwardly. The suction side of the fans is located in a plenum 65 which is closed from a top chamber 66 by panel 67 between the stands 46, 58 and communicates with the bank of the freezing coils 60. With this arrangement the fans cause the air within the freezing tunnel to circulate in closed loops, and namely, from each fan through the turning baffles 64, up through both courses of both of the belts 23–24, across the top chamber 66 into the coil bank 60, and down through the latter into the plenum 65 to the suction side of the fan for recirculation.

It will be noted that respective vertical and horizontal transverse baffles 69–70 are provided at the ends of the tunnel beneath the lower course 24B of the lower belt 24. These baffles isolate the product on the ingress and egress portions of the upper course 24A of the lower belt from action of the fans 63 and cause relatively dead air spaces 53A–53B adjacent the tunnel openings 21–22.

For defrosting and cleaning of the belts 23–24 a spray washer 71 and blow pipes 72 from a blower 73 are mounted in the loading compartment 28 between the courses of the upper belt 23, and a second spray washer 74 and blow pipes 75 for the blower 73 are mounted between the courses of the lower belts 24. The washers and blowers are complemented by collection pans 76–77 which are located beneath the lower runs 23B and 24B of the upper and lower belts, respectively. These pans are suitably baffled and provision is made for flushing and draining thereof.

In the operation of the freezing tunnel the product to be frozen is continuously delivered in the chamber 28 to the upper course 24A of the lower belt 24 by the conveyor 41 and shaker 42. The product then enters the freezing tunnel through the opening 21, passes through a dead air space, and is then subjected to the refrigerated air blast from the fans 63 passing upwardly therethrough. The location and facing of the vanes 64 and speed of the fans is adjusted to cause agitation of the particular product being frozen by the up-draft to keep it from freezing to the belt 24 and to retard the freezing of individual pieces of the product to one another.

During this freezing operation the lower course 23B of the upper belt serves the important function of isolating the product in the zone 53 so that particles of the product will not be drawn up into the upper chamber 66 and down into the freezing coils 60 with the circulating air. Much of the moisture from the product collects on the upper belt 23 rather than on the refrigeration coils 60 and hence the operating life of the freezing tunnel between coil defrosting operations is materially increased. The frost resulting from this moisture is continuously removed from the upper belt by warm air blasting downwardly onto the lower run 23A through the blow pipes 72 and this action may be supplemented by the spray washer 71 if required. Thus it is seen that the upper belt 23 has two important functions, and namely, to help isolate the frozen product within the zone 53 and to remove moisture from the freezing tunnel before it has an opportunity to collect on the freezing coils.

The amount of updraft can be varied the length of the freezing tunnel as by using variable speed motors on the fans 63, there normally being less agitation requirement after the surface moisture on the comestibles has frozen. After the frozen product passes through the tunnel exit 22 into the chamber 30 it drops from the lower belts into the hopper 40. The empty lower belt after passing around the sprocket 32 and back to the freezing tunnel is cleaned and defrosted by action of warm air from the blower 73 delivered through the blow pipes 75, and in addition, water spray from the pipes 74 can be used for this purpose.

During defrosting of the refrigerated coils 60 by spraying water from the manifold 61, the various tunnel chambers, and particularly the freezing zone 53, can be readily cleaned by removing the related access panels. This cleaning operation is greatly simplified because of the confining action of the lower run 23A of the upper belt in preventing the comestibles from being carried into the upper chamber 66, the freezing coils 60, the lower plenum 65, and into the fans 63.

It will be understood that although there are certain advantages in running the upper belt 23 so that the lower course 23B thereof runs counter to the upper course 24A of the lower belt 24, the principles of the present invention can be carried out by running the upper and lower belts with opposite directions of rotation rather than in the same direction of rotation as illustrated. This modification can be easily accomplished merely by driving the sprockets 31 and 32 both from the gear box 37 rather than driving the sprocket 31 by a belt from the sprocket 32. In such a case it would be preferable to move the washer 71 and blower 72 to a position above the upper course 23A of the upper belt 23 and to shift the collection pan 75 between the upper and lower runs of the upper belt.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In a continuous freezer, an endless perforated belt conveyor having an upper product-carrying course, movable non-refrigerating perforated combination frost collecting and product confining means spaced directly above said upper course, means for enclosing an intermediate part of the length of the space located between said upper course and said combination means to define a freezing zone, and means for passing a gaseous cooling medium upwardly through said freezing zone by passage thereof upwardly through said upper course and combination means.

2. In a continuous freezer, an endless perforated belt conveyor having an upper product-carrying course, perforated frost collecting means movable relative to the path of said upper course and spaced therefrom, refrigeration means, circulating means for passing a gaseous cooling medium in a closed loop upwardly through said upper course, then through said frost collecting means, and then past said refrigeration means for intake to said circulating means, and defrosting means outside of said loop for defrosting said frost collecting means.

3. In a continuous freezer, an endless perforated belt conveyor having an upper product-carrying course, an endless movable non-refrigerating perforated frost collecting means spaced above said upper course, driving means for moving said conveyor and frost collecting means, means for enclosing an intermediate part of the space located between said upper course and said frost collecting means to define a freezing zone, means for passing a gaseous cooling medium upwardly through said upper course, freezing zone and frost collecting means, and defrosting means outside of said freezing zone for defrosting said frost collecting means.

4. In a continuous freezer, an endless perforated conveyor belt having an upper product-carrying course, an endless perforated frost collecting belt spaced above said conveyor belt, means for moving said belts and means for passing a gaseous cooling medium upwardly through both said belts.

5. The freezer of claim 4 in which the lower course of said frost collecting belt has its travel path generally parallel to that of said upper course of the conveyor belt.

6. The freezer of claim 5 in which means are provided for enclosing the sides of an intermediate part of the length of the space between said belts.

7. The freezer of claim 4 in which the lower course of said frost collecting belt moves counter to the direction of travel of the upper course of said conveyor belt.

8. The freezer of claim 4 in which defrosting means acts on said frost collecting belt outside of the path of said cooling medium.

9. In a continuous freezer, an endless perforated conveyor belt having an upper product-carrying course, an endless perforated frost collecting belt spaced above said conveyor belt and extending in the same general direction, means for enclosing an intermediate part of the length of the space between said belts to define a freezing zone, means for passing a gaseous cooling medium upwardly through said upper product-carrying course, freezing zone and the lower course of said frost collecting belt, and defrosting means outside of said freezing zone for continuously defrosting said frost collecting belt.

10. The freezer of claim 9 in which said lower course of the frost collecting belt moves counter to said upper product-carrying course of said conveyor belt, said defrosting means being arranged to defrost said lower course adjacent the end thereof corresponding to the beginning of said upper product-carrying course.

11. In a continuous freezer, an endless perforated conveyor belt, an endless perforated frost collecting belt spaced above said conveyor belt and extending in the same general direction, means for passing a gaseous cooling medium upwardly through an intermediate part of said conveyor belt and thence upwardly through a part of said frost collecting belt, and defrosting means outside of the path of said cooling medium for continuously defrosting said frost collecting belt.

References Cited by the Examiner

UNITED STATES PATENTS

| | | | |
|---|---|---|---|
| 1,822,077 | 9/31 | Birdseye | 62—303 |
| 1,930,414 | 10/33 | Buhr | 62—380 |
| 2,237,256 | 4/41 | Finnegan | 62—63 |
| 2,254,420 | 9/41 | Cleveland | 62—380 |
| 3,115,756 | 12/63 | Overbye | 62—380 X |

EDWARD J. MICHAEL, *Primary Examiner.*